(12) United States Patent
Luisi

(10) Patent No.: US 7,051,750 B1
(45) Date of Patent: May 30, 2006

(54) GOVERNOR SPRING BRACKET ASSEMBLY

(75) Inventor: Frank Luisi, Bensenville, IL (US)

(73) Assignee: Sonnax Industries, Inc., Bellows Falls, VT (US)

( * ) Notice: Subject to any disclaimer, the term of this patent is extended or adjusted under 35 U.S.C. 154(b) by 307 days.

(21) Appl. No.: 10/759,635

(22) Filed: Jan. 16, 2004

Related U.S. Application Data

(60) Provisional application No. 60/440,064, filed on Jan. 16, 2003.

(51) Int. Cl.
*G05D 13/10* (2006.01)

(52) U.S. Cl. .............................. 137/53; 137/50; 137/56

(58) Field of Classification Search .................. 137/50, 137/53, 56
See application file for complete search history.

(56) References Cited

U.S. PATENT DOCUMENTS

| | | | | |
|---|---|---|---|---|
| 3,322,133 A | * | 5/1967 | Searles | 137/54 |
| 3,431,929 A | * | 3/1969 | Croswhite | 137/56 |
| 3,631,871 A | * | 1/1972 | Shimosaki | 137/54 |
| 3,642,014 A | * | 2/1972 | Searles | 137/54 |
| 3,690,335 A | * | 9/1972 | Ichimura et al. | 137/54 |
| 4,194,520 A | * | 3/1980 | Kuusik | 137/54 |
| 4,628,952 A | * | 12/1986 | Yamashita et al. | 137/54 |
| 5,234,014 A | * | 8/1993 | Queitzsch, Jr. | 137/56 |

* cited by examiner

*Primary Examiner*—Eric Keasel
*Assistant Examiner*—Craig Schneider
(74) *Attorney, Agent, or Firm*—Clifford F. Rey

(57) ABSTRACT

A governor spring bracket assembly that attaches to an exterior surface of a shaft-mounted governor valve assembly for an automatic transmission is disclosed. The present governor spring bracket assembly functions to counterbalance the effect of centrifugal force on the governor valve weights, which is generated by rotation of the governor with the transmission output shaft. The present governor spring bracket assembly aligns and supports a calibrated compression spring in functional engagement with the primary governor valve weight to return it to its closed position in relation to the governor output circuit at low output shaft speeds thereby preventing excessive governor output pressure, 2nd gear starts, and improper shift timing.

15 Claims, 5 Drawing Sheets

GOVERNOR SPRING BRACKET ASSEMBLY

CROSS-REFERENCE TO RELATED APPLICATION

This patent application claims the benefit under 35 U.S.C. 119(e) of U.S. Provisional Patent Application No. 60/440,064 filed Jan. 16, 2003, entitled Governor Spring Bracket Assembly.

BACKGROUND OF INVENTION

The present invention relates to automatic transmissions and, more particularly, to a governor spring bracket assembly, which functions to counterbalance the centrifugal force acting on the governor valve weights in order to assist in the return stroke of the governor valve weight in a shaft-mounted governor. Applications for the present governor spring bracket assembly include the Chrysler A413, A404, A470, and A670 transmissions.

Automatic transmission systems of the prior art have a hydraulic circuit sub-system which includes at least a hydraulic pump, a valve body having fluid conducting passages or circuits, input and exhaust ports formed within the fluid circuits, and a plurality of spool valves so-called because of their resemblance to sewing thread spools. Such valves are comprised of cylindrical pistons having control diameters or lands formed thereon, which alternately open and close the ports to regulate the flow and pressure of automatic transmission fluid (hereinafter "ATF") within the fluid circuits to actuate different components of the transmission. It will be understood that in describing hydraulic circuits, ATF usually changes names when it passes through an orifice or control valve in a specific circuit.

In such an automatic transmission the governor valve assembly (hereinafter "governor") functions to vary transmission fluid pressure based on output shaft rotational speed (i.e. road speed). When governor pressure overcomes throttle pressure, an upshift takes place. Thus, maintaining fluid pressure within the governor circuit is critical to proper shift timing in the transmission.

The governor on the Chrysler transmissions is a shaft-mounted type governor that uses centrifugal force acting on the governor valve weights or pistons (hereinafter "weights") to vary governor output pressure. As the vehicle begins to move and the transmission output shaft turns, centrifugal force begins to act upon the weights causing them to move radially outward away from the output shaft. As this happens the line pressure inlet ports formed in the governor begin to open and the exhaust ports close. This causes the governor fluid outlet to release ATF at line pressure to other valve assemblies within the governor circuit. When output shaft speed decreases, the weights (assisted only by hydraulic pressure) move back toward the output shaft closing the inlet ports and opening the exhaust ports thereby lowering governor output pressure.

In the Chrysler transmissions a problem arises when the governor weights stick in the governor leaving the inlet ports open after output shaft speed drops to 0 rpm. Even the slightest inlet port opening will result in governor output pressure stroking the 1–2 shift valve, which causes a second gear start.

Thus, the present invention has been developed to resolve this problem and other shortcomings of the prior art.

SUMMARY OF THE INVENTION

Accordingly, the present invention is a governor spring bracket assembly that attaches to an exterior surface of the original equipment manufacture (hereinafter "OEM") governor valve assembly. The present governor spring bracket assembly functions to counterbalance the effect of centrifugal force generated by rotation of the output shaft and acting on the internal governor valve weights. The present governor spring bracket assembly supports and aligns a calibrated compression spring that engages the primary governor weight, which functions to return the weight to its rest condition at low output shaft speeds and to prevent excessive governor output pressure and improper shift timing.

Other features and technical advantages of the present invention will become apparent from a study of the following description and the accompanying drawings.

BRIEF DESCRIPTION OF THE DRAWINGS

The novel features of the present invention are set forth in the appended claims. The invention itself, however, as well as other features and advantages thereof will be best understood by reference to the following detailed description of an illustrative embodiment when read in conjunction with the accompanying figures, wherein:

DETAILED DESCRIPTION OF THE PREFERRED EMBODIMENTS

Figure 1:
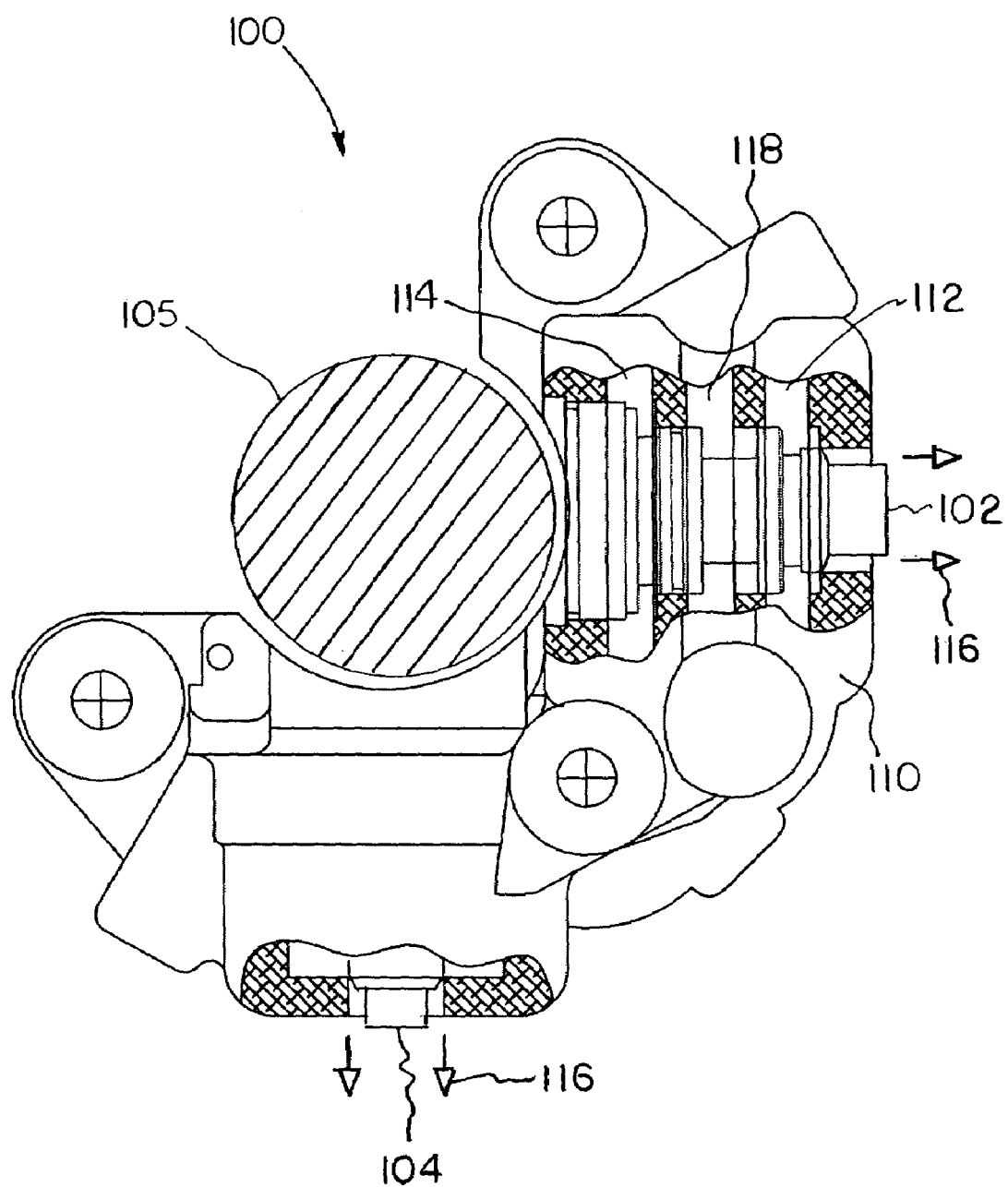
FIG. 1 is a partially cutaway view of the governor of a Chrysler transmission mounted on the output shaft and is labeled Prior Art.
Figure 2:
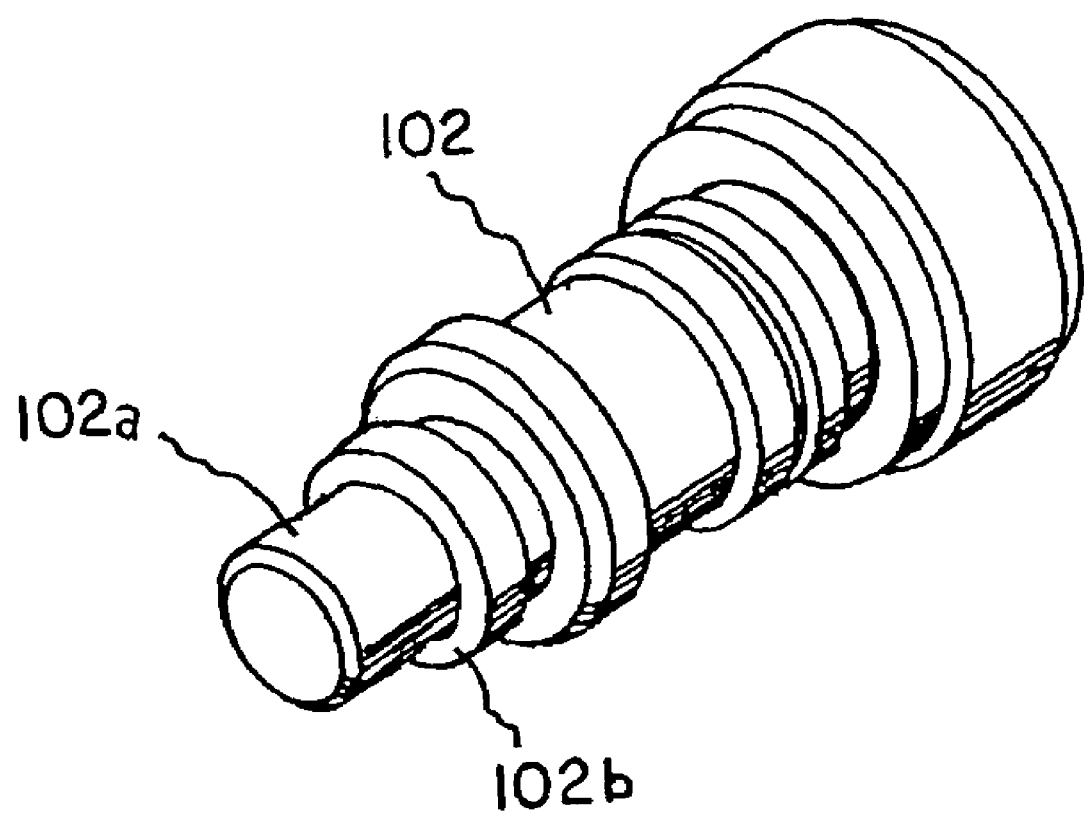
FIG. 2 is a perspective view of the primary governor weight shown in FIG. 1 and is labeled Prior Art.

Prior to describing the present invention in detail, it may be beneficial to briefly review the basic function of the governor valve assembly and its associated hydraulic circuit within the Chrysler transmissions wherein the present invention is utilized. With reference to the drawings there is shown therein a diagram of a governor valve assembly or governor, indicated generally at 100 and illustrated in FIG. 1. The governor 100 on the Chrysler transmissions is a shaft-mounted type governor installed on the output shaft 105. The governor 100 utilizes centrifugal force acting on governor weights 102, 104 to vary outlet pressure. In the embodiment shown the two weights (i.e. primary weight 102 and secondary weight 104) reside within mating bores in the governor body 110. The primary weight 102 (as more clearly shown in FIG. 2) regulates line pressure to control $1^{st}$ to $2^{nd}$ gear shift timing. The secondary weight 104 regulates line pressure to control $2^{nd}$ to $3^{rd}$ gear shift timing.

In operation as the vehicle whereon the governor 100 is installed begins to move and the transmission output shaft 105 turns, centrifugal force begins to act upon the weights 102, 104 as will be best understood by referring back to FIG. 1. The rotation of the governor 100 with the shaft 105 causes the weights 102, 104 to move in a radially outward direction away from the output shaft 105 as shown by directional arrows 116, but at different rates. This is because secondary weight 104 includes an internal compression spring (not shown) designed to resist centrifugal force. Initially, the pressure inlet port 112 associated with weight 102 begins to open and the exhaust port 114 begins to close. This causes pressurized ATF to flow through the governor outlet 118 into the governor output circuit.

As the output shaft speed increases, the weights 102, 104 continue to move radially outward away from the shaft 105 until the inlet port 112 is fully open and the exhaust port 114 is fully closed at which point governor output pressure is the same as pump line pressure. The governor's output pressure is delivered to one side of the 1–2 shift valve (not shown) to affect the point at which an upshift takes place. The higher the governor's rotational speed, the higher the ATF pressure delivered to the 1–2 shift valve. The 1–2 shift valve balances pressure from the governor fluid outlet 118 against fluid pressure from the throttle valve output (not shown). When the speed of the output shaft 105 decreases, the weights 102, 104 move back toward the output shaft closing the inlet port 112 and opening the exhaust port 114 thereby lowering governor output pressure.

A problem arises in the Chrysler transmissions when the primary governor weight 102, which is not provided with an internal return spring, sticks in the governor body 110 due to mechanical wear and/or residue accumulation. When this occurs, the inlet port 112 can remain open after the rotation of the output shaft 105 is substantially reduced, which causes excessive governor outlet pressure at low engine speed and results in $2^{nd}$ gear starts and improper shift timing. Accordingly, the present invention has been developed to resolve this problem and will now be described.

Figure 3:
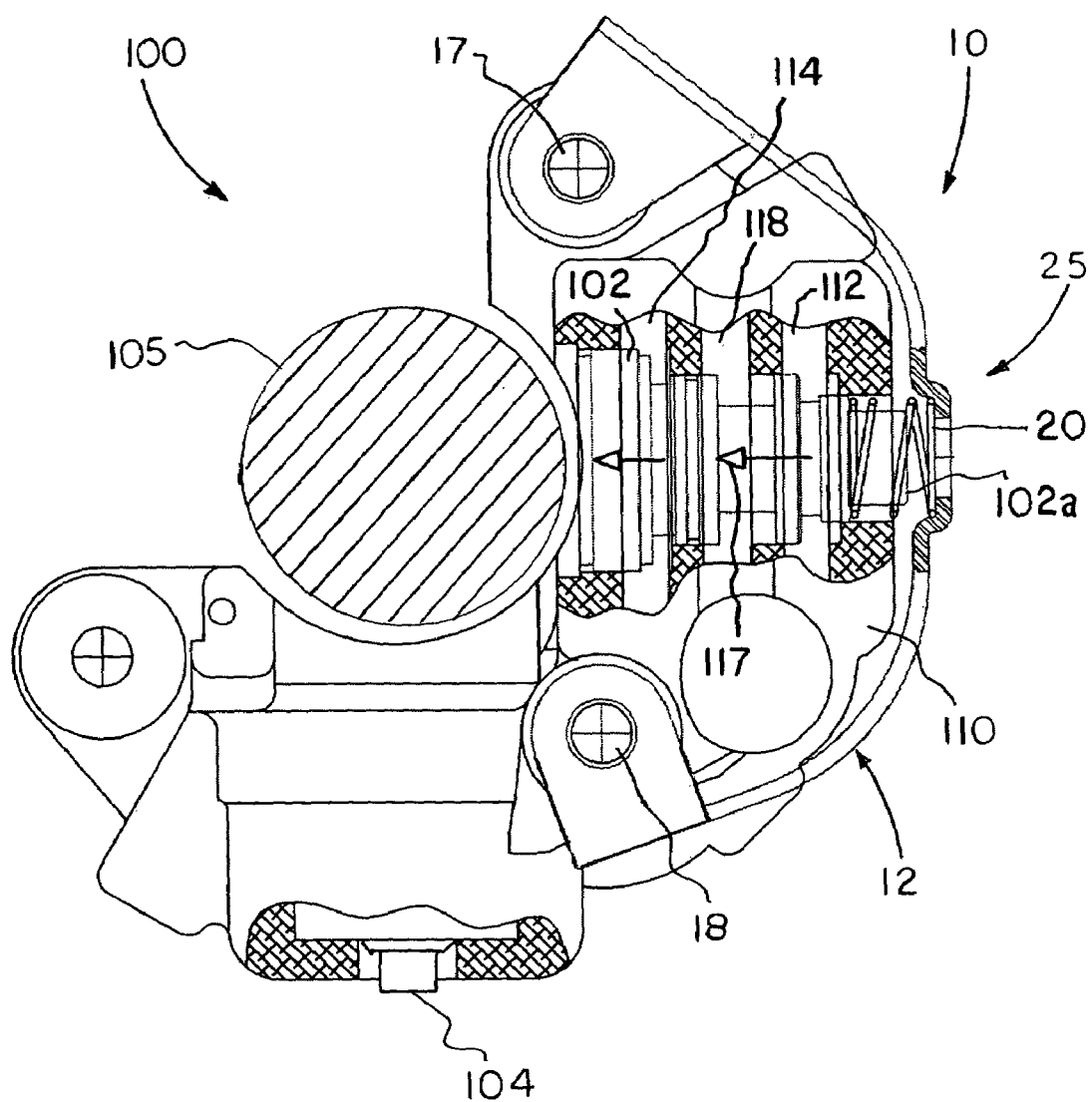
FIG. 3 is a partially cutaway view of the governor of FIG. 1 showing the governor spring bracket assembly of the present invention installed thereon.

Referring to FIG. 3 there is shown therein a governor spring bracket assembly in accordance with the present invention, indicated generally at 10. It can be seen that the governor spring bracket assembly 10 including a contoured bracket, indicated generally at 12, and a compression spring 20 is mounted on the exterior of the governor body 110 such that spring 20 engages the primary governor weight 102 as shown.

Spring 20 is radially disposed about a distal end portion 102a of the weight 102 in coaxial alignment and is seated against an adjacent shoulder portion 102b (FIG. 2) in its functional position. Spring 20 is calibrated to a predetermined spring rate that is designed to permit normal operation of the primary governor valve weight 102 in all speed ranges. Advantageously, spring 20 also functions to assist with the return stroke of the weight 102 to its rest or closed condition in relation to the outlet 118 when the output shaft 105 drops back to low speed.

In one embodiment, among others, the contoured bracket member 12 is a sheet metal component fabricated from cold rolled steel of approximately 0.050 inches thickness. As seen in FIG. 3 bracket 12 conforms closely to the exterior contour of the governor body 110 to facilitate high speed rotation of the present spring bracket assembly 10 within the confines of the transmission housing wherein it is located.

Figure 4:
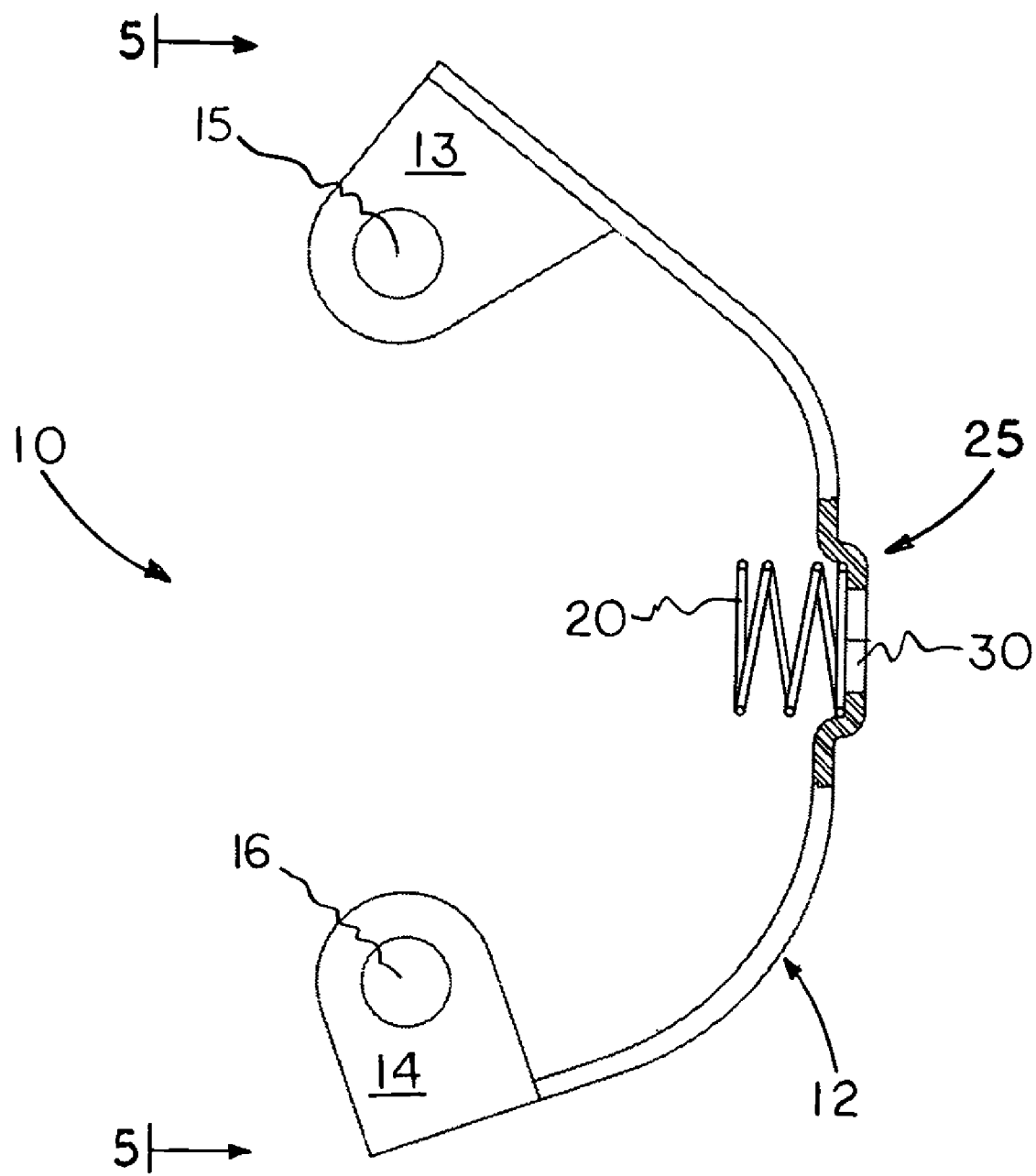
FIG. 4 is a plan view of the present governor spring bracket assembly.
Figure 5:
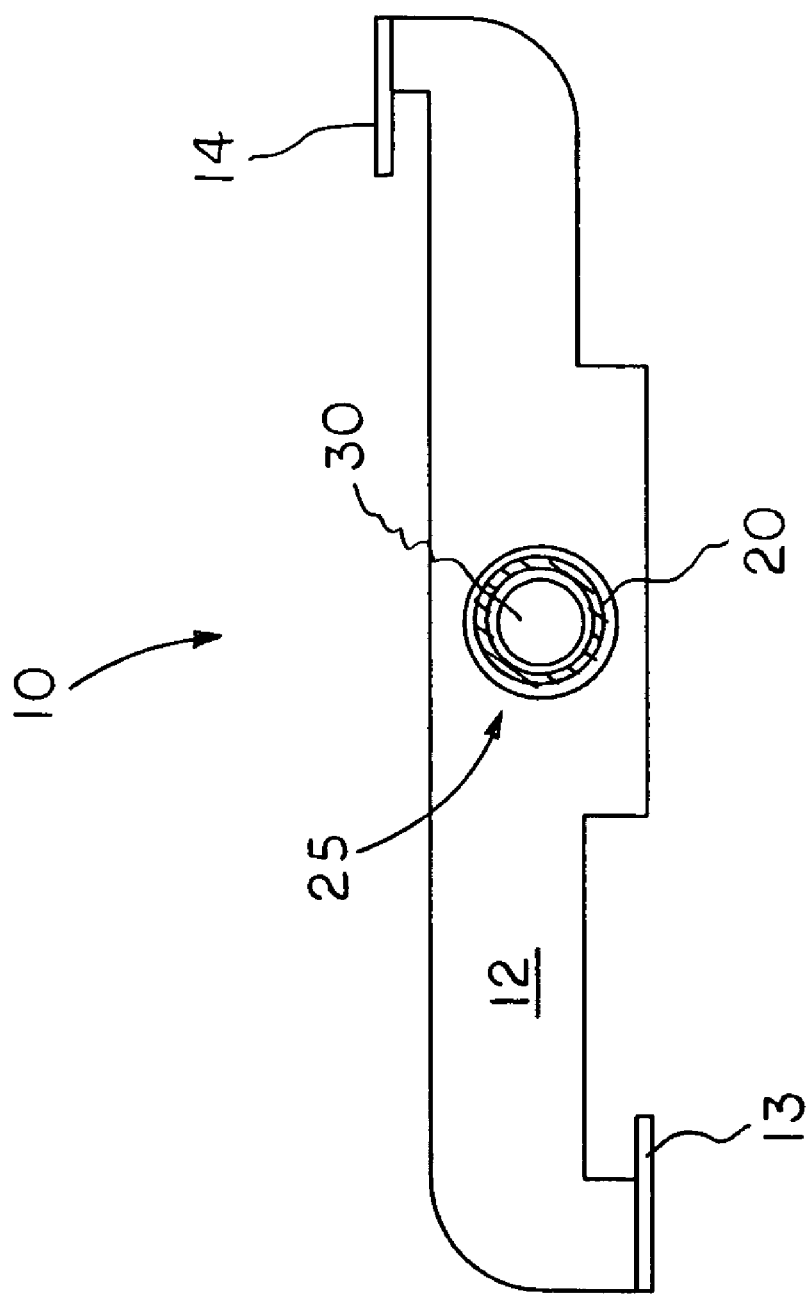
FIG. 5 is an elevational view of the present spring bracket assembly taken along line 5—5 of FIG. 4.

Referring to FIGS. 4 and 5 bracket member 12 includes integrally formed tabs 13, 14 formed at right angles thereto on the opposed lateral edges thereof and positioned at opposite ends of the bracket. Tabs 13, 14 each include mounting holes 15, 16 respectively, which receive fasteners such as machine screws 17, 18 (FIG. 3) for mechanical attachment to the governor body 110. Bracket 12 also includes a circular spring seat, indicated generally at 25, formed at the approximate midpoint thereof for seating the compression spring 20 and capturing the spring in its functional position intermediate the bracket member and the primary governor weight 102. Spring seat 25 includes a central relief aperture 30, which provides clearance for weight 102 at the furthest extent of its outward travel.

Referring again to FIG. 3, as the vehicle begins to move and the transmission output shaft 105 rotates, centrifugal force begins to act upon the primary weight 102 causing it to move radially outward away from the output shaft 105. As this happens the line pressure inlet port 112 formed in the governor body 110 begins to open and the exhaust port 114 closes. This causes the governor 100 to release ATF at line pressure via fluid outlet 118 to other hydraulically actuated components within the governor circuit.

When the rotational speed of the output shaft 105 decreases, the primary weight 102 moves back toward the output shaft 105 (as shown by directional arrows 117 in FIG. 3 in the reverse direction) closing the inlet port 112 and the outlet 118 and also reopening the exhaust port 114 thereby lowering governor output pressure. Spring 20 functions to urge the weight 102 back to a rest condition in this low output shaft speed to zero output shaft speed range to prevent excessive governor output pressure. Thus, accurate control of governor output pressure and $1^{st}$ to $2^{nd}$ gear upshift timing is maintained.

Although not specifically illustrated in the drawings, it should be understood that additional equipment and structural components will be provided as necessary and that all of the components described above are arranged and supported in an appropriate fashion to form a complete and operative external governor spring bracket assembly incorporating features of the present invention.

Moreover, although illustrative embodiments of the invention have been described, a latitude of modification, change, and substitution is intended in the foregoing disclosure, and in certain instances some features of the invention will be employed without a corresponding use of other features. Accordingly, it is appropriate that the appended claims be construed broadly and in a manner consistent with the scope of invention.

What is claimed is:

1. An external governor spring bracket assembly for use in combination with a shaft-mounted governor valve assembly in an automatic transmission, said governor valve assembly including a primary valve weight disposed in opening and closing relation to a governor fluid outlet, said spring bracket assembly comprising:
   a compression spring disposed in coaxial engagement with said primary valve weight; and
   a governor spring bracket conforming generally to an external surface of said governor valve assembly, said bracket including perpendicular mounting tabs integrally formed on opposed side edges of said bracket at opposite ends thereof for attachment to said governor valve assembly, wherein said bracket supports said compression spring in engagement with said primary governor weight, said compression spring urging said primary governor weight to a closed condition in relation to said governor fluid outlet thereby preventing excessive governor output pressure at low shaft speed.

2. A governor spring bracket assembly of claim 1 wherein said bracket is attached to said external surface of said governor valve assembly by mechanical fasteners extending through said mounting tabs.

3. A governor spring bracket assembly of claim 1 wherein a spring seat is formed in said bracket in coaxial alignment with said governor spring weight.

4. A governor spring bracket assembly of claim 3 wherein said spring seat includes a central relief aperture that provides clearance for said primary governor weight at the furthest extent of its outward travel.

5. A governor spring bracket assembly of claim 3 wherein said compression spring is disposed in said spring seat intermediate said primary governor weight and said bracket to counterbalance the centrifugal force acting on said primary governor valve weight upon rotation of said governor valve assembly.

6. A governor spring bracket assembly of claim 5 wherein said compression spring is calibrated to a predetermined spring rate.

7. An improved shaft-mounted governor valve assembly for use in combination with an automatic transmission, wherein said governor valve assembly includes a primary valve weight and a secondary valve weight actuated by centrifugal force to open and close a governor fluid outlet, wherein the improvement comprises:

a governor spring bracket assembly comprising a compression spring and a governor spring bracket conforming generally to an external surface of said governor valve assembly, said bracket including perpendicular mounting tabs integrally formed on opposed side edges of said bracket at opposite ends thereof for attachment to said governor valve assembly, wherein said bracket supports said compression spring in functional engagement with said primary governor weight, said compression spring urging said primary governor weight to a closed condition in relation to said governor fluid outlet thereby preventing excessive governor output pressure at low output shaft speed.

8. An improved shaft-mounted governor valve assembly of claim 7 wherein said bracket is attached to said external surface of said governor valve assembly by mechanical fasteners extending through said mounting tabs.

9. An improved shaft-mounted governor valve assembly of claim 7 wherein a spring seat is formed in said bracket in coaxial alignment with said primary governor weight.

10. An improved shaft-mounted governor valve assembly of claim 9 wherein said spring seat includes a central relief aperture that provides clearance for said primary governor weight at the furthest extent of its outward travel.

11. An improved shaft-mounted governor valve assembly of claim 9 wherein said compression spring is disposed in said spring seat intermediate said primary governor weight and said bracket to counterbalance centrifugal force acting on said primary governor valve weight upon rotation of said governor valve assembly.

12. An improved shaft-mounted governor valve assembly of claim 11 wherein said compression spring is calibrated to a predetermined spring rate.

13. A method of counterbalancing centrifugal force acting on a governor valve weight within a shaft-mounted governor valve assembly in an automatic transmission, wherein said valve weight is actuated by said centrifugal force to open a governor fluid outlet upon rotation of said governor valve assembly, said method comprising the steps of:

providing a governor spring bracket assembly including a compression spring and a governor spring bracket conforming to an external surface of said governor valve assembly;

forming perpendicular mounting tabs on opposed side edges of said bracket to fit said external surface of said governor valve assembly;

positioning said compression spring intermediate said bracket and said primary governor weight in coaxial alignment such that said spring engages said weight;

attaching said governor spring bracket assembly onto said external surface of said governor valve assembly with said mounting tabs; and spring biasing said primary governor weight radially inward to a closed position in relation to said governor fluid outlet to counterbalance said centrifugal force thereby preventing excessive governor output pressure at low output shaft speed.

14. The method of claim 13 wherein the step of providing further includes the step of:

calibrating said compression spring to a predetermined spring rate.

15. The method of claim 13 wherein the step of attaching is carried out by mechanical fasteners such as machine screws.

* * * * *